United States Patent [19]
Horiuchi et al.

[11] Patent Number: 5,177,041
[45] Date of Patent: Jan. 5, 1993

[54] CATALYST FOR PURIFYING EXHAUST GAS FROM DIESEL ENGINES

[75] Inventors: Makoto Horiuchi; Satoshi Inui; Koichi Saito, all of Himeji, Japan

[73] Assignee: Nippon Shokubai Co., Ltd., Osaka, Japan

[21] Appl. No.: 718,261

[22] Filed: Jun. 20, 1991

[30] Foreign Application Priority Data

Jun. 20, 1990 [JP] Japan .................. 2-159922

[51] Int. Cl.$^5$ .............. B01J 29/04; B01J 35/04; B01J 23/40
[52] U.S. Cl. ................... 502/66; 502/242; 502/325; 502/527
[58] Field of Search .............. 423/213.5; 502/66, 242, 502/325, 527

[56] References Cited

U.S. PATENT DOCUMENTS

| | | | |
|---|---|---|---|
| 3,914,376 | 10/1975 | Barker | 423/213.5 |
| 3,965,040 | 6/1976 | Kobylinski et al. | 502/213 |
| 4,128,506 | 12/1978 | Hegedus et al. | 423/213.5 |
| 4,152,301 | 5/1979 | Summers et al. | 423/213.5 |
| 4,153,579 | 5/1979 | Summers et al. | 423/213.5 |
| 4,172,047 | 10/1979 | Gandhi et al. | 423/213.5 |
| 4,806,519 | 2/1989 | Chiba et al. | 423/213.5 |

FOREIGN PATENT DOCUMENTS 0262962 6/1988 European Pat. Off. .

Primary Examiner—Carl F. Dees
Attorney, Agent, or Firm—Sherman and Shalloway

[57] ABSTRACT

A catalyst for purifying exhaust gas from Diesel engines, having a catalyst component-carrying layer made of a refractory three-dimensional structure having carried thereon a catalyst component containing (a) a refractory inorganic oxide, (b) at least one noble metal selected from palladium and platinum, and (c) rhodium, wherein the rhodium is contained only in an upper layer portion of the catalyst component-carrying layer corresponding to no more than 80% in thickness of the catalyst component-carrying layer.

9 Claims, No Drawings

CATALYST FOR PURIFYING EXHAUST GAS FROM DIESEL ENGINES

The present invention relates to a catalyst for purifying exhaust gas from Diesel engines.

Recently, fine particulate substances (composed mainly of fine particles of solid carbon and of sulfur based substances such as sulfates, fine particles of liquid or solid high molecular weight hydrocarbons, etc., hereafter generically referred to as "fine particulate substances") in exhaust gases, particularly from Diesel engines, have attracted attention from a point view of keeping environmental hygiene. This is because the fine particulate substances are mostly no greater than 1 micrometer in particle diameter and float in the air readily, resulting in that they can be taken up into human bodies by aspiration. Therefore, it is naturally expected that legal control on the discharge of such fine particulate substances from Diesel engines will hereafter become more severe.

On the other hand, it is true that the amount of the fine particulate substances discharged from Diesel engines have been reduced to some extent as the pressure of fuel injection in Diesel engines increased and the control of timing of fuel injection was improved. However, components soluble in organic solvents (SOF) contained in the fine particulate substances and composed mainly of liquid high molecular weight hydrocarbons cannot be removed by the aforementioned improvement of the engine, resulting in the increase in the proportion of SOF in the fine particulate substances. Since SOF contains harmful components such as carcinogenic substances, it has become an important problem to remove SOF as well as the fine particulate substances.

As the method of removing the fine particulate substances, a method has been studied in which fine particulate substances in the exhaust gas from a Diesel engine are trapped with a catalyst having a catalytic substance for the combustion of carbon-based fine particles on a refractory three-dimensional structure such as ceramics foam, wire mesh, foamed metal, closed type ceramics honeycomb, open-flow-type ceramics honeycomb, or metal honeycomb, and the trapped fine particulate substances are heated by heating means such as exhaust gas produced under ordinary driving conditions or an electric heater to remove carbon-based fine particles by combustion.

Generally, it is desired that catalysts for purifying exhaust gas from Diesel engines have the following performances:

(a) They have high efficiencies of burning harmful components such as unburned hydrocarbons and carbon monoxide as well as carbon-based fine particles even at low temperatures;

(b) They have low capabilities of oxidizing sulfur dioxide ($SO_2$) generated by the sulfur component contained in gas oil used as a fuel into sulfur trioxide ($SO_3$) so that the production of sulfates (sulfur trioxide or sulfuric acid mists derived from sulfur dioxide) can be suppressed, and (c) They can endure continuous operation under high loads (so-called high-temperature durability).

Hitherto, various proposals have been made with a view to increasing the efficiency of burning and removing carbon-based fine particles.

For example, Japanese Patent Publication Laid-Open No. 24597/1980 discloses platinum family element-based catalysts such as rhodium (7.5%)/platinum alloy, platinum/palladium (50/50) mixture, palladium on tantalum oxide or cerium oxide, alloys of palladium and no more than 75% by weight of platinum, etc. Reportedly, these catalysts are also effective for removing SOF.

In addition thereto, Japanese Patent Publication Laid-Open Nos. 129030/1986, 149222/1986, and 146314/1986 disclose catalyst compositions containing palladium and rhodium as main active components to which are added alkali metals, alkaline earth metals, copper, lanthanum, zinc, manganese, etc. Japanese Patent Publication Laid-Open No. 82944/1984 discloses catalyst compositions composed of at least one metal selected from copper, alkali metals, molybdenum and vanadium, and at least one metal selected from platinum, rhodium and palladium, in combination.

As the catalyst for removing SOF in exhaust gas from Diesel engines, an open-type honeycomb noble metal-based oxide catalyst having throughholes parallel to the gas flow has been reported (cf. SAE Paper, 810263).

However, while all the aforementioned conventional catalysts are effective for the combustion and removal of carbon-based fine particles and the removal of SOF to some extent, they have defects that because of their high capability of oxidizing sulfur dioxide they increase the amount of sulfates produced to rather decrease the removal ratio of the entire fine particulate substances, and that new problems on environment arise because of the resulting sulfates.

As described above, no catalyst has been found yet that has the performances (a), (b) and (c) required for the catalysts for purifying exhaust gas from Diesel engines and the performance of removing SOF simultaneously.

Accordingly, an object of the present invention is to provide a catalyst for purifying exhaust gas from Diesel engines which can efficiently remove fine particulate substances in exhaust gas from Diesel engines.

Another object of the present invention is to provide a catalyst for purifying exhaust gas from Diesel engines which has a capability of burning harmful components such as unburned hydrocarbons and carbon monoxide as well as carbon-based fine particles even at low temperatures, and which has a low capability of oxidizing sulfur dioxide to suppress the production of sulfates.

Still another object of the present invention is to provide a catalyst for purifying exhaust gas from Diesel engines which can efficiently remove SOF in exhaust gas in Diesel engines.

Yet another object of the present invention is to provide a catalyst for purifying exhaust gas from Diesel engines which has a good high-temperature durability and can be mounted in Diesel cars without raising problems from a practical viewpoint.

As a result of intensive investigations, the present inventors have found that a catalyst having a catalyst component-carrying layer made of a refractory three-dimensional structure having carried thereon a catalyst component containing (a) a refractory inorganic oxide, (b) palladium and/or platinum, and (c) rhodium in which the rhodium is contained selectively in an upper layer portion of the catalyst component-carrying layer is suitable for the above-described objects.

Therefore, according to the present invention, there is provided a catalyst for purifying exhaust gas from Diesel engines, having a catalyst component-carrying layer made of a refractory three-dimensional structure having carried thereon a catalyst component containing (a) a refractory inorganic oxide, (b) at least one noble metal selected from palladium and platinum, and (c) rhodium, wherein said rhodium is contained only in an upper layer portion of said catalyst component-carrying layer corresponding to no more than 80 % in thickness of the catalyst component-carrying layer.

As the refractory inorganic oxide (a), there can be used activated alumina, silica, titania, zirconia, silica-alumina, alumina-zirconia, alumina-titania, silica titania, silica-zirconia, titania-zirconia, zeolite, etc. Of these, there can be cited zirconia as the most suitable one that suppresses the production of sulfates and has a high selective oxidizability.

As the starting material for the platinum (b), there can be cited chloroplatinic acid, dinitrodiaminoplatinum, platinum tetramine chloride, platinum sulfide complex salts, etc. The starting materials for the palladium (b) include palladium nitrate, palladium chloride, palladium tetramine chloride, and palladium sulfide complex salts.

As the starting material for the rhodium (c), there can be cited rhodium nitrate, hexaamminerhodium chloride, rhodium sulfide complex salts, etc.

As the refractory three-dimensional structure, there can be used ceramics foams, open-flow-type ceramics honeycombs, wall-flow-type honeycomb monolith, open-flow-type metal honeycombs, foamed metals or metal meshes, etc. In particular, when exhaust gas from Diesel engines contains no more than 100 mg/m$^3$ of fine particulate substances and the content of SOF in the fine particulate substances is no less than 20%, open-flow-type ceramics honeycombs or metal honeycombs are used advantageously as the refractory three-dimensional structure.

The catalyst of the present invention is characterized by having the aforementioned refractory three-dimensional structure which carries thereon the above-described catalyst components (a), (b) and (c), and contains rhodium only in an upper layer portion of the catalyst component-carrying layer, the upper layer portion corresponding to no more than 80% in thickness of the catalyst component-carrying layer. That is, in the catalyst of the present invention, rhodium is contained only in the upper layer portion of the catalyst component-carrying layer extending from the surface of the catalyst component-carrying layer in a direction of the thickness thereof, and corresponding to a region from above 0% up to 80%, in thickness of the catalyst component-carrying layer.

The method of making rhodium to be contained only in the upper layer portion of the catalyst component-carrying layer is not limited particularly, and the following method can be cited as an example.

That is, a catalyst component containing the refractory inorganic oxide (a) and the platinum and/or palladium (b) is applied to the refractory three-dimensional structure so as to be carried thereon to form a first layer, and then a catalyst component containing the refractory inorganic oxide (a) and the rhodium (c) is applied on the first layer to form a second layer to thereby form a catalyst component-carrying layer containing the rhodium (c) only in the second layer as the upper layer.

The second layer may further contain the platinum and/or palladium (b). However, the construction in which the first and second layers contain selectively the platinum and/or palladium (b) and the rhodium (c), respectively is more effective than the aforementioned construction as the form of using the noble metal.

The catalyst of the present invention may contain at least one element selected from rare earth elements such as lanthanum, cerium, praseodymium, neodymium and samarium in addition to the refractory inorganic oxide (a), the palladium and/or platinum (b), and the rhodium (c).

In the catalyst of the present invention, the amounts of the refractory inorganic oxide (a), the palladium and/or platinum (b), and the rhodium (c) which constitute the catalyst component-carrying layer preferably are within the ranges of 3 to 300 g, larger than 0 and no larger than 6 g preferably 0.01 to 6 g, larger than 0 and no larger than 6 g preferably 0.01 to 6 g, and 0.01 to 1 g, respectively, each per liter of the refractory three-dimensional structure.

It is preferred that the amount of the aforementioned rare earth element added as required is within the range of 1 to 50 g per liter of the refractory three-dimensional structure.

As described above, in the catalyst of the present invention, the rhodium (c) must be contained as the essential component, and the upper layer portion containing the rhodium (c) occupies at most 80% of total thickness of the catalyst component-carrying layer. When the catalyst contains no rhodium (c), or if the catalyst contains it, when the upper layer portion containing it occupies above 80% of total thickness of the catalyst component-carrying layer, the catalyst has a low capability of removing fine particulate substances, thus failing to achieve the objects of the present invention.

There is no limitation on the method of preparing the catalyst of the present invention and specific examples thereof include the following methods.

(1) Powder of a refractory inorganic oxide is wet-ground to obtain a slurry. A refractory three-dimensional structure is dipped in the slurry. After the removal of excessive slurry, the refractory three-dimensional structure is dried at 80° to 250° C., and then calcined at 300° to 850° C.

Next, the refractory three-dimensional structure is dipped in an aqueous solution containing a predetermined amount of a rhodium compound. After having absorbed and carried the rhodium compound thereon, excessive solution is removed from the refractory three-dimensional structure, which is dried at 80° to 250° C. and then calcined at 300° to 850° C.

Finally, the refractory three-dimensional structure is dipped in an aqueous solution containing predetermined amounts of compounds of platinum and/or palladium, and after the removal of excessive solution, the refractory three-dimensional structure is dried at 80 to 250° C. and then calcined at 300° to 850° C. to obtain the objective catalyst.

(2) A refractory three-dimensional structure is dipped in a slurry containing compounds of platinum and/or palladium and a refractory inorganic oxide. After the removal of excessive slurry, the refractory three-dimensional structure is dried at 80° to 250° C. and calcined at 300° to 800° C. to form a first layer.

Then, the refractory three-dimensional structure having formed thereon the aforementioned first layer is dipped in a slurry containing a rhodium compound and a refractory inorganic oxide. After the removal of excessive slurry, the refractory three-dimensional structure is dried at 80° to 250° C. and then calcined at 300° to 850° C. to form a second layer to obtain the objective catalyst.

The catalyst of the present invention has a high capability of burning and removing harmful components such as unburned hydrocarbons and carbon monoxide as well as carbon-based fine particles even at low temperatures, and in addition has a low capability of oxidizing sulfur dioxide to suppress the production of sulfates. Therefore, the catalyst of the present invention is excellent in the reduction of the fine particulate substances in exhaust gas from Diesel engines, and the use of the catalyst of the present invention results in efficient purification of exhaust gas from Diesel engines.

The catalyst of the present invention is also excellent in the capability of removing SOF and is effective for purifying exhaust gas from Diesel engines.

Since it has a good high-temperature durability, the catalyst of the present invention can be mounted in Diesel cars without raising problems from a practical viewpoint.

As described above the catalyst of the present invention is useful as a catalyst for purifying exhaust gas from Diesel Engines.

Hereafter, the present invention will be explained concretely by way of examples.

The distribution of rhodium in the catalyst component-carrying layer was measured using EPMA (Electron Probe Microanalyzer manufactured by Shimazu Seisakusho Co., Ltd.).

EXAMPLE 1

Alumina (1 kg) having a specific surface area of 90 $m^2/g$ was introduced in an aqueous solution of palladium nitrate containing 12.5 g of palladium (hereafter, expressed as "12.5 g of palladium nitrate (calculated as palladium)") dissolved in deionized water. After being stirred well, the mixture was dried at 150° C. for 3 hours, and then calcined at 500° C. for 2 hours to obtain alumina palladium powder.

The powder (1 kg) was wet-ground to form a slurry. In the slurry was dipped a cylindrical cordierite honeycomb carrier of 5.66 inch in diameter X 6 00 inch in length having about 300 cells/in$^2$ of cross-sectional area of open-flow-type gas communication cells. After the removal of excessive slurry, the carrier was dried at 150° C. for 2 hours and then calcined at 500° C. for 1 hour to obtain a structure having carried thereon 81 g per liter of the structure, of the alumina-palladium powder.

Next, alumina (1 kg) having a specific surface area of 90 $m^2/g$ was introduced in an aqueous solution of 5 g of rhodium nitrate (calculated as rhodium) dissolved in deionized water. After being stirred well, the mixture was dried at 150° C. for 3 hours, and then calcined at 500° C. for 2 hours to obtain alumina-rhodium powder. The alumina-rhodium powder (1 kg) was wet-ground to form a slurry. In the slurry was dipped the aforementioned alumina-palladium-carrying structure. After the removal of excessive slurry, the carrier was dried at 150° C. for 3 hours and then calcined at 500° C. for 1 hour to obtain a catalyst having carried thereon 20.1 g, per liter of the structure, of the alumina-rhodium powder.

The resulting catalyst carried thereon alumina, palladium and rhodium in amounts of 100 g, 1 g and 0.1 g, respectively, per liter of the structure.

Rhodium was contained only in the upper layer portion corresponding to 30% in thickness of the catalyst component-carrying layer.

EXAMPLE 2

Alumina (1 kg) having a specific surface area of 150 $m^2/g$ was introduced in an aqueous solution of 20 g of dinitrodiaminoplatinum (calculated as platinum) dissolved in deionized water. After being stirred well, the mixture was dried at 150° C. for 3 hours, and then calcined at 500° C. for 2 hours to obtain alumina-platinum powder.

The resulting powder (1 kg) was wet-ground to form a slurry. In the slurry was dipped the same cordierite honeycomb carrier as used in Example 1. After the removal of excessive slurry, the carrier was dried at 150° C. for 2 hours and then calcined at 500° C. for 1 hour to obtain a structure having carried thereon 51 g, per liter of the structure, of the alumina-platinum powder.

Next, alumina (1 kg) having a specific surface area of 90 $m^2/g$ was introduced in an aqueous solution of 10 g of rhodium nitrate (calculated as rhodium) dissolved in deionized water. After being stirred well, the mixture was dried at 150° C. for 3 hours, and then calcined at 500° C. for 2 hours to obtain alumina-rhodium powder. The alumina-rhodium powder (1 kg) was wet-ground to form a slurry. In the slurry was dipped the afore-mentioned alumina-platinum-carrying structure. After the removal of excessive slurry, the carrier was dried at 150° C. for 3 hours and then calcined at 500° C. for 1 hour to obtain a catalyst having carried thereon 50.5 g, per liter of the structure, of the alumina-platinum powder.

The resulting catalyst carried thereon alumina, platinum and rhodium in amounts of 100 g, 1 g and 0.5 g, respectively, per liter of the structure.

Rhodium was contained only in the upper layer portion corresponding to 60% in thickness of the catalyst component-carrying layer.

EXAMPLE 3

Alumina (1 kg) having a specific surface area of 150 $m^2/g$ was introduced in an aqueous solution of 16.7 g of palladium nitrate (calculated as palladium) and 8.3 g of chloroplatinic acid (calculated as platinum) dissolved in deionized water. After being stirred well, the mixture was dried at 150° C. for 3 hours, and then calcined at 750° C. for 1 hour to obtain alumina-palladium-platinum powder.

The resulting powder (1 kg) was wet-ground to form a slurry. In the slurry was dipped the same cordierite honeycomb carrier as used in Example 1. After the removal of excessive slurry, the carrier was dried at 150° C. for 2 hours and then calcined at 500° C. for 1 hour to obtain a structure having carried thereon 62 g, per liter of the structure, of the alumina-palladium-platinum powder.

Next, alumina (1 kg) having a specific surface area of 120 $m^2/g$ was introduced in an aqueous solution of 12.5 g of hexaamminerhodium chloride (calculated as rhodium) dissolved in deionized water. After being stirred well, the mixture was dried at 180° C. for 3 hours, and then calcined at 500° C for 1 hour to obtain aluminarhodium powder. The alumina-rhodium powder (1 kg) was wet-ground to form a slurry. In the slurry was dipped the aforementioned alumina-palladium-platinum-carrying structure. After the removal of excessive slurry, the carrier was dried at 150° C. for 2 hours and then calcined at 500° C. for 1 hour to obtain a catalyst having carried thereon 40.5 g, per liter of the structure, of the alumina-rhodium powder.

The resulting catalyst carried thereon alumina, palladium, platinum and rhodium in amounts of 100 g, 1 g, 0.5 g and 0.5 g, respectively, per liter of the structure.

Rhodium was contained only in the upper layer portion corresponding to 50% in thickness of the catalyst component-carrying layer.

EXAMPLE 4

Zirconia (1 kg) having a specific surface area of 80 $m^2/g$ was introduced in an aqueous solution of 20 g of palladium nitrate (calculated as palladium) dissolved in deionized water. After being stirred well, the mixture was dried at 150° C. for 6 hours, and then calcined at 700° C. for 1 hour to obtain zirconia-palladium powder.

The resulting powder (1 kg) was wet-ground to form a slurry. In the slurry was dipped the same cordierite honeycomb carrier as used in Example 1. After the removal of excessive slurry, the carrier was dried at 150° C. for 3 hours and then calcined at 500° C. for 1 hour to obtain a structure having carried thereon 51 g, per liter of the structure, of the zirconia-palladium powder.

Next, zirconia (1 kg) having a specific surface area of 80 $m^2/g$ was introduced in an aqueous solution of 20 g of rhodium nitrate (calculated as rhodium) dissolved in deionized water. After being stirred well, the mixture was dried at 150° C. for 3 hours, and then calcined at 500° C. for 1 hour to obtain zirconia-rhodium powder.

The zirconia-rhodium powder was wet-ground to form a slurry. In the slurry was dipped the aforementioned zirconia-rhodium-carrying structure. After the removal of excessive slurry, the carrier was dried at 180° C. for 2 hours and then calcined at 700° C. for 2 hours to obtain a catalyst having carried thereon 5.1 g, per liter of the structure, of the zirconia-rhodium powder.

The resulting catalyst carried thereon zirconia, palladium and rhodium in amounts of 55 g, 1 g and 0.1 g, respectively, per liter of the structure.

Rhodium was contained only in the upper layer portion corresponding to 20% in thickness of the catalyst component-carrying layer.

EXAMPLE 5

Zirconia (1 kg) having a specific surface area of 60 $m^2/g$ was introduced in an aqueous solution of 25 g of palladium chloride (calculated as palladium) and 165 g of praseodymium nitrate dissolved in deionized water. After being stirred well, the mixture was dried at 150° C. for 6 hours, and then calcined at 500° C. for 2 hours to obtain zirconia-palladium-praseodymium oxide powder.

The resulting powder (1 kg) was wet-ground to form a slurry. In the slurry was dipped a cylindrical stainless steel honeycomb carrier of 5.66 inch in diameter X 6.0 inch in length having about 300 cells/$in^2$ of cross-sectional area of open-flow-type gas communication cells. After the removal of excessive slurry, the carrier was dried at 180° C. for 2 hours and then calcined at 650° C. for 3 hours to obtain a structure having carried thereon 87 g, per liter of the structure, of the zirconia-palladium-praseodymium oxide powder.

Next, zirconia (1 kg) having a specific surface area of 90 $m^2/g$ was introduced in an aqueous solution of 5 g of rhodium nitrate (calculated as rhodium) dissolved in deionized water. After being stirred well, the mixture was dried at 150° C. for 3 hours, and then calcined at 500° C. for 2 hours to obtain zirconia-rhodium powder.

The resulting powder (1 kg) was wet-ground to form a slurry. In the slurry was dipped the aforementioned zirconia-palladium-praseodymium oxide-carrying structure. After the removal of excessive slurry, the carrier was dried at 150° C. for 6 hours and then calcined at 400° C. for 1 hour to obtain a catalyst having carried thereon 20.1 g, per liter of the structure, of the zirconia-rhodium powder.

The resulting catalyst carried thereon zirconia, palladium, rhodium and praseodymium oxide in amounts of 100 g, 2 g, 0.1 g and 5 g, respectively, per liter of the structure.

Rhodium was contained only in the upper layer portion corresponding to 30% in thickness of the catalyst component-carrying layer.

EXAMPLE 6

Alumina (1 kg) having a specific surface area of 150 $m^2/g$ was introduced in an aqueous solution of 20 g of dinitrodiaminoplatinum (calculated as platinum) and 1,510 g of cerium nitrate dissolved in deionized water. After being stirred well, the mixture was dried at 150° C. for 6 hours, and then calcined at 500° C. for 2 hours to obtain alumina-platinum-ceria powder.

The powder (1 kg) was wet-ground to form a slurry. In the slurry was dipped a cylindrical cordierite honeycomb carrier of 5.66 inch in diameter X 6.00 inch in length having about 200 cells/$in^2$ of cross-sectional area of open-flow-type gas communication cells. After the removal of excessive slurry, the carrier as dried at 150° C. for 3 hours and then calcined at 400° C. for 2 hours to obtain a structure having carried thereon 81 g, per liter of the structure, of the alumina-platinum-ceria powder.

Next, alumina (1 kg) having a specific surface area of 150 $m^2/g$ was introduced in an aqueous solution of 5 g of rhodium nitrate (calculated as rhodium) and 266 g of lanthanum nitrate dissolved in deionized water. After being stirred well, the mixture was dried at 150° C. for 3 hours, and then calcined at 500° C. for 1 hour to obtain alumina-rhodium-lanthanum oxide powder.

The alumina-rhodium powder (1 kg) was wet-ground to form a slurry. In the slurry was dipped the aforementioned alumina-platinum-ceria-carrying structure. After the removal of excessive slurry, the carrier was dried at 150° C. for 3 hours and then calcined at 600° C. for 1 hour to obtain a catalyst having carried thereon 110.5 g, per liter of the structure, of the alumina-rhodium-lanthanum oxide powder.

The resulting catalyst carried thereon alumina, platinum, rhodium, ceria and lanthanum oxide in amounts of 150 g, 1 g, 0.5 g, 30 g and 10 g, respectively, per liter of the structure.

Rhodium was contained only in the upper layer portion corresponding to 70% in thickness of the catalyst component-carrying layer.

EXAMPLE 7

Silica (1 kg) having a specific surface area of 55 $m^2/g$ was introduced in an aqueous solution of 20 g of palladium nitrate (calculated as palladium) and 6 g of chloroplatinic acid (calculated as platinum) dissolved in deionized water. After being stirred well, the mixture was dried at 150° C. for 3 hours, and then calcined at 600° C. for 2 hour to obtain silica-palladium-platinum powder.

The resulting powder (1 kg) was wet-ground to form a slurry. In the slurry was dipped the same cordierite honeycomb carrier as used in Example 5. After the removal of excessive slurry, the carrier was dried at 150° C. for 3 hours and then calcined at 500° C. for 1 hour to obtain a structure having carried thereon 51.3 g. per liter of the structure, of the silica-palladium-platinum powder.

Next, titania (1 kg) having a specific surface area of 65 $m^2/g$ was introduced in an aqueous solution of 50 g of rhodium nitrate (calculated as rhodium) dissolved in deionized water. After being stirred well, the mixture was dried at 150° C. for 3 hours, and then calcined at 400° C. for 1 hour to obtain titania-rhodium powder.

The resulting powder (1 kg) was wet-ground to form a slurry. In the slurry was dipped the aforementioned silica-palladium-platinum-carrying structure. After the removal of excessive slurry, the carrier was dried at 150° C. for 3 hours and then calcined at 500° C for 1 hour to obtain a catalyst having carried thereon 10.5 g. per liter of the structure, of the titania-rhodium powder.

The resulting catalyst carried thereon silica, titania, palladium, platinum and rhodium in amounts of 50 g, 10 g. 1 g, 0.3 g and 0.5 g, respectively, per liter of the structure.

Rhodium was contained only in the upper layer portion corresponding to 25% in thickness of the catalyst component-carrying layer.

EXAMPLE 8

Alumina (1 kg) having a specific surface area of 150 $m^2/g$ was introduced in an aqueous solution of 25 g of palladium sulfide complex salt (calculated as palladium) and 12.5 g of platinum sulfide complex salt (calculated as platinum) dissolved in deionized water. After being stirred well, the mixture was dried at 150° C. for 3 hours, and then calcined at 800° C. for 5 hours to obtain alumina-palladium-platinum powder.

The resulting powder (1 kg) was wet-ground to form a slurry. In the slurry was dipped the same cordierite honeycomb carrier as used in Example 1. After the removal of excessive slurry, the carrier was dried at 150° C. for 6 hours and then calcined at 500° C. for 1 hour to obtain a structure having carried thereon 41.5 g, per liter of the structure, of the alumina-palladium-platinum powder.

Next, zirconia (1 kg) having a specific surface area of 40 $m^2/g$ was introduced in an aqueous solution of 8.3 g dinitrodiaminoplatinum (calculated as platinum) and 8.3 g of rhodium nitrate (calculated as rhodium) dissolved in deionized water. After being stirred well, the mixture was dried at 150° C. for 6 hours, and then calcined at 750° C. for 4 hours to obtain zirconia-platinum-rhodium powder.

The resulting powder (1 kg) was wet-ground to form a slurry. In the slurry was dipped the aforementioned alumina-palladium-platinum-carrying structure. After the removal of excessive slurry, the carrier was dried at 150° C. for 3 hours and then calcined at 400° C. for 2 hours to obtain a catalyst having carried thereon 61.0 per liter of the structure, of the zirconia-palladium-platinum powder.

The resulting catalyst carried thereon alumina, zirconia, palladium, platinum and rhodium in amounts of 40 g. 60 g. 1 g, 1 g and 0.5 g, respectively, per liter of the structure.

Rhodium was contained only in the upper layer portion corresponding to 70% in thickness of the catalyst component-carrying layer.

EXAMPLE 9

One kg of alumina having a specific surface area of 150 $m^2/g$ was weighed and wet-ground with water to form a slurry. In the slurry was dipped a cylindrical cordierite honeycomb carrier of 5.66 inch in diameter X 6.00 inch in length having about 400 cells/$in^2$ of cross-sectional area of open-flow-type gas communication cells. After the removal of excessive slurry, the carrier was dried at 150° C. for 3 hours and then calcined at 500° C. for 1 hour to obtain a structure having carried thereon the alumina powder.

The structure was dipped in 2.5 liters of an aqueous rhodium nitrate solution containing 0.4 g of rhodium at 80° C. to adsorb rhodium thereon. After the removal of excessive solution, the structure was dried at 150° C. for 3 hours, and then calcined at 700° C. for 1 hour to have rhodium carried on the aforementioned alumina-carrying structure.

Next, the above-described alumina-rhodium-carrying structure was dipped in 2.5 liters of an aqueous solution of 3.8 g of chloroplatinic acid (calculated as platinum) and 38.5 g of palladium chloride (calculated as palladium) dissolved in deionized water. After the removal of excessive solution, the structure was dried at 150° C. for 3 hours, and then calcined at 500° C. for 2 hours to obtain a catalyst.

The resulting catalyst carried thereon alumina, palladium, platinum and rhodium in amounts of 55 g, 2 g, 0.2 g and 0.2 g, respectively, per liter of the structure.

Rhodium was contained only in the upper layer portion corresponding to 20% in thickness of the catalyst component-carrying layer.

EXAMPLE 10

A catalyst was obtained in the same manner as in Example 4 except that instead of the cordierite honeycomb carrier, a cylindrical cordierite ceramics foam of 5.66 inch in diameter ×6.00 inch in length having about 12 cells/in of cells formed of ceramics skeleton and having a void ratio of about 90% was used.

The resulting catalyst carried thereon zirconia, palladium and rhodium in amounts of 55 g, 1 g and 0.1 g, respectively, per liter of the structure.

Rhodium was contained only in the upper layer portion corresponding to 20% in thickness of the catalyst component-carrying layer.

COMPARATIVE EXAMPLE 1

Alumina (1 kg) having a specific surface area of 150 $m^2/g$ was introduced in an aqueous solution of 10 g of palladium nitrate (calculated as palladium) dissolved in deionized water. After being stirred well, the mixture was dried at 150° C. for 3 hours, and then calcined at 500° C. for 1 hour to obtain alumina-palladium powder.

The resulting powder (1 kg) was wet-ground to form a slurry. In the slurry was dipped the same cordierite honeycomb carrier as used in Example 1. After the removal of excessive slurry, the carrier was dried at 150° C. for 3 hours and then calcined at 500° C. for 1 hour to obtain a catalyst.

The resulting catalyst carried thereon alumina and palladium in amounts of 100 g and 1 g, respectively, per liter of the structure.

COMPARATIVE EXAMPLE 2

A catalyst was obtained in the same manner as in Comparative Example 1 except that dinitroaminoplatinum was used instead of palladium nitrate.

The resulting catalyst carried thereon alumina and platinum in amounts of 100 g and 1 g, respectively, per liter of the structure.

COMPARATIVE EXAMPLE 3

Alumina (1 kg) having a specific surface area of 150 m²/g was introduced in an aqueous solution of 10 g of palladium nitrate (calculated as palladium) and 10 g of chloroplatinic acid (calculated as platinum) dissolved in deionized water. After being stirred well, the mixture was dried at 150° C. for 3 hours, and then calcined at 750° C. for 1 hour to obtain alumina-palladium-platinum powder.

Subsequently, a catalyst was obtained in the same manner as in Comparative Example 1.

The resulting catalyst carried thereon alumina, palladium and platinum in amounts of 100 g, 1 g and 1 g, respectively, per liter of the structure.

COMPARATIVE EXAMPLE 4

Alumina (1 kg) having a specific surface area of 90 m2/g was introduced in an aqueous solution of 10 g of palladium nitrate (calculated as palladium) and 0.1 g of rhodium nitrate (calculated as rhodium) dissolved deionized water. After being stirred well, the mixture was dried at 150° C. for 3 hours, and then calcined at 500° C. for 2 hours to obtain alumina-palladium-rhodium powder.

Subsequently, a catalyst was obtained in the same manner as in Comparative Example 1.

The resulting catalyst carried thereon alumina, palladium and rhodium in amounts of 100 g, 1 g and 0.1 g, respectively, per liter of the structure.

COMPARATIVE EXAMPLE 5

Alumina (1 kg) having a specific surface area of 150 m²/g was introduced in an aqueous solution of 10 g of dinitrodiaminoplatinum (calculated as platinum) and 5 g of rhodium nitrate (calculated as rhodium) dissolved in deionized water. After being stirred well, the mixture was dried at 150° C. for 3 hours, and then calcined at 500° C. for 1 hour to obtain alumina-platinum-rhodium powder.

Subsequently, a catalyst was obtained in the same manner as in Comparative Example 1.

The resulting catalyst carried thereon alumina, platinum and rhodium in amounts of 100 g, 1 g and 0.5 g, respectively, per liter of the structure.

COMPARATIVE EXAMPLE 6

Alumina (1 kg) having a specific surface area of 150 m²/g was introduced in an aqueous solution of 10 g of palladium nitrate (calculated as palladium), 5 g of chloroplatinic acid (calculated as platinum) and 5 g of hexaamminerhodium chloride (calculated as rhodium) dissolved in deionized water. After being stirred well, the mixture was dried at 150° C. for 3 hours, and then calcined at 750° C. for 1 hour to obtain alumina-palladium-platinum-rhodium powder.

Subsequently, a catalyst was obtained in the same manner as in Comparative Example 1.

The resulting catalyst carried thereon alumina, palladium, platinum and rhodium in amounts of 100 g, 1 g, 0.5 g and 0.5 g, respectively, per liter of the structure.

Table 1 shows the amounts of the respective components and the proportions of the thickness of the upper layer portion in which rhodium was contained to the thickness of the catalyst component-carrying layer for the respective catalysts obtained in Examples 1 to 11 and Comparative Examples 1 to 6.

TABLE 1

| Run No. | Refractory Inorganic Oxide (a) Kind | Amount (g/l of carrier) | Noble Metal (b) Kind | Amount (g/l of carrier) | Rhodium (c) Amount (g/l of carrier) | Additional Element Kind | Amount (g/l of carrier) | Refractory Three-Dimensional Structure | Proportion of Thickness* (%) |
|---|---|---|---|---|---|---|---|---|---|
| Ex. 1 | $Al_2O_3$ | 100 | Pd | 1 | 0.1 | — | — | Ceramics honeycomb | 30 |
| Ex. 2 | $Al_2O_3$ | 100 | Pt | 1 | 0.5 | — | — | Ceramics honeycomb | 60 |
| Ex. 3 | $Al_2O_3$ | 100 | Pd/Pt | 1/0.5 | 0.5 | — | — | Ceramics honeycomb | 50 |
| Ex. 4 | $ZrO_2$ | 55 | Pd | 1 | 0.1 | — | — | Ceramics honeycomb | 20 |
| Ex. 5 | $ZrO_2$ | 100 | Pd | 2 | 0.1 | $Pr_6O_{11}$ | 5 | Metal honeycomb | 30 |
| Ex. 6 | $Al_2O_3$ | 150 | Pt | 1 | 0.5 | $CeO_2/La_2O_3$ | 30/10 | Ceramics honeycomb | 70 |
| Ex. 7 | $SiO_2/TiO_2$ | 50/10 | Pd/Pt | 1/0.3 | 0.5 | — | — | Metal honeycomb | 25 |
| Ex. 8 | $Al_2O_3/ZrO_2$ | 40/60 | Pd/Pt | 1/1 | 0.5 | — | — | Ceramics honeycomb | 70 |
| Ex. 9 | $Al_2O_3$ | 55 | Pd/Pt | 2/0.2 | 0.2 | — | — | Ceramics honeycomb | 20 |
| Ex. 10 | $ZrO_2$ | 55 | Pd | 1/0.1 | 0.1 | — | — | Ceramics foam | 20 |
| Comp. Ex. 1 | $Al_2O_3$ | 100 | Pd | 1 | — | — | — | Ceramics honeycomb | — |
| Comp. Ex. 2 | $Al_2O_3$ | 100 | Pt | 1 | — | — | — | Ceramics honeycomb | — |
| Comp. Ex. 3 | $Al_2O_3$ | 100 | Pd/Pt | 1/1 | — | — | — | Ceramics honeycomb | — |
| Comp. Ex. 4 | $Al_2O_3$ | 100 | Pd | 1 | 0.1 | — | — | Ceramics honeycomb | 100 |

TABLE 1-continued

| Run No. | Refractory Inorganic Oxide (a) Kind | Amount (g/l of carrier) | Noble Metal (b) Kind | Amount (g/l of carrier) | Rhodium (c) Amount (g/l of carrier) | Additional Element Kind | Amount (g/l of carrier) | Refractory Three-Dimensional Structure | Proportion of Thickness*) (%) |
|---|---|---|---|---|---|---|---|---|---|
| Comp. Ex. 5 | Al$_2$O$_3$ | 100 | Pt | 1 | 0.5 | — | — | Ceramics honeycomb | 100 |
| Comp. Ex. 6 | Al$_2$O$_3$ | 100 | Pd/Pt | 1/0.5 | 0.5 | — | — | Ceramics honeycomb | 100 |

*)Proportion to the thickness of the upper layer portion containing rhodium to the thickness of the catalyst component-carrying layer

REFERENCE EXAMPLE

Evaluation was made on the performance of purifying exhaust gas from Diesel engines for the respective catalysts obtained in Examples 1 to 10 and Comparative Examples 1 to 6.

Using a supercharged direct injection-type Diesel engine (4 valves, 2,800 cc) and gas oil with a sulfur content of 0.47% by weight as a fuel, the following experiments were carried out.

Each catalyst was attached to an exhaust pipe from the aforementioned engine, and durability tests were practiced for 300 hours under the conditions of full load at an engine rotation number of 2,500 rpm and catalyst inlet temperature of 600° C.

Thereafter, the contents of fine particulate substances in the exhaust gas before entrance in the catalyst bed (inlet) and after getting out of the catalyst bed (outlet) were measured using a conventional dilution tunnel method under the conditions an engine rotation number of 2,000 rpm, a torque of 8.5 kg.m, and a catalyst inlet temperature of 300° C. to obtain a degree of removal of fine particulate substances, i.e., purification ratio (%). At the same time, analysis was made on sulfur dioxide, gaseous hydrocarbons, a carbon monoxide in the exhaust gas before entering the catalyst bed and after passage through the catalyst bed to obtain their conversions.

Table 2 show the results obtained.

What is claimed is:

1. A catalyst for purifying exhaust gas from Diesel engines, having a catalyst component-carrying layer made of a refractory three-dimensional structure having carried thereon a catalyst component containing (a) a refractory inorganic oxide, (b) at least one noble metal selected from palladium and platinum, and (c) rhodium, wherein said rhodium is contained only in an upper layer portion of said catalyst component-carrying layer corresponding to no more than 80% in thickness of said catalyst component-carrying layer.

2. The catalyst for purifying exhaust gas from Diesel engines as claimed in claim 1, wherein said catalyst component-carrying layer comprises a first layer contacting said refractory three-dimensional structure and a second layer provided on said first layer, said first layer comprising a first catalyst component composed of said refractory inorganic oxide (a), and said at least one noble metal selected from palladium and platinum (b), and said second layer comprising a second catalyst component composed of said rhodium (c).

3. The catalyst for purifying exhaust gas from Diesel engines as claimed in claim 1, wherein said refractory inorganic oxide is at least one member selected from the group consisting of alumina, silica, titania, zirconia, silica-alumina, alumina-zirconia, alumina-titania, silica-titania, silica-zirconia, titania-zirconia and zeolite.

TABLE 2

| Run No. | Content of Fine Particulate Substance in Exhaust Gas Inlet (mg/m$^3$) | Outlet (mg/m$^3$) | Purification Ratio of Fine Particulate Substance (%) | Conversion of Hydrocarbon (%) | Conversion of Carbon Monoxide (%) | Conversion of Sulfur Dioxide (%) |
|---|---|---|---|---|---|---|
| Ex. 1 | 40.5 | 20.1 | 50 | 83 | 68 | 0.1 |
| Ex. 2 | 39.8 | 22.3 | 44 | 84 | 79 | 0.4 |
| Ex. 3 | 40.2 | 19.2 | 52 | 85 | 82 | 0.2 |
| Ex. 4 | 38.5 | 16.4 | 57 | 85 | 76 | 0.0 |
| Ex. 5 | 41.3 | 14.9 | 64 | 87 | 73 | 0.0 |
| Ex. 6 | 37.9 | 20.9 | 45 | 82 | 83 | 0.2 |
| Ex. 7 | 40.0 | 20.7 | 48 | 78 | 74 | 0.1 |
| Ex. 8 | 38.7 | 26.2 | 32 | 84 | 85 | 0.5 |
| Ex. 9 | 38.9 | 21.6 | 44 | 81 | 78 | 0.3 |
| Ex. 10 | 40.2 | 19.0 | 53 | 81 | 69 | 0.0 |
| Comp. Ex. 1 | 41.0 | 54.2 | −3.2 | 81 | 69 | 3.7 |
| Comp. Ex. 2 | 39.5 | 591 | −1,396 | 83 | 81 | 58 |
| Comp. Ex. 3 | 37.8 | 327 | −765 | 86 | 83 | 32 |
| Comp. Ex. 4 | 42.1 | 41.9 | 0.5 | 72 | 37 | 2.3 |
| Comp. Ex. 5 | 40.6 | 457 | −1,025 | 69 | 62 | 44 |
| Comp. Ex. 6 | 38.7 | 234 | −505 | 76 | 64 | 21 |

4. The catalyst for purifying exhaust gas from Diesel engines as claimed in claim 1, wherein said refractory inorganic oxide is zirconia.

5. The catalyst for purifying exhaust gas from Diesel engines as claimed in claim 1, wherein said refractory three-dimensional structure is a ceramics foam, an open-flow-type ceramics honeycomb, a wall-flow-type honeycomb monolith, an open-flow-type metal honeycomb, a metal foam or a metal mesh.

6. The catalyst for purifying exhaust gas from Diesel engines as claimed in claim 1, wherein said refractory three-dimensional structure is an open-flow-type ceramics honeycomb or an open-flow-type metal honeycomb.

7. The catalyst according to claim 6 wherein the amount of refractory inorganic oxide (a) is in the range of 3 to 300 grams per liter of the refractory three-dimensional structure.

8. The catalyst according to claim 7 wherein the amount of palladium and/or platinum (b) is from 0.01 to 6 grams per liter of the refractory three-dimensional structure.

9. The catalyst according to claim 7 wherein the amount of rhodium (c) is in the range of 0.01 to 1 gram per liter of the refractory three-dimensional structure.

* * * * *